(12) United States Patent
Hampel et al.

(10) Patent No.: US 6,442,211 B1
(45) Date of Patent: Aug. 27, 2002

(54) SYSTEM FOR DIGITAL INFORMATION TRANSMISSION WITH ASSOCIATED METHODS AND DEVICES

(75) Inventors: Herrmann Hampel, Grosshabersdorf; Johannes Huber, Langensendelbach; Klaus Lehmann, Hoechstadt/Aisch; Thomas Wagner, Kammerstein, all of (DE)

(73) Assignee: IAD Gesellschaft für Informatik, Automatisierung und Datenverarbeitung mbH, Grosshabersdorf (DE)

(*) Notice: Subject to any disclaimer, the term of this patent is extended or adjusted under 35 U.S.C. 154(b) by 0 days.

(21) Appl. No.: 09/275,643

(22) Filed: Mar. 22, 1999

Related U.S. Application Data

(63) Continuation of application No. PCT/EP97/05162, filed on Sep. 19, 1997.

(30) Foreign Application Priority Data

Sep. 20, 1996 (DE) .......................................... 196 38 654

(51) Int. Cl.[7] .............................................. H04L 27/28
(52) U.S. Cl. ........................................ 375/260; 375/262
(58) Field of Search ................................ 375/260, 261, 375/262; 370/210

(56) References Cited

U.S. PATENT DOCUMENTS

| | | | |
|---|---|---|---|
| 4,313,197 A | | 1/1982 | Maxemchuk |
| 5,291,289 A | * | 3/1994 | Hulyalkar et al. .......... 348/723 |
| 5,345,439 A | | 9/1994 | Marston |
| 5,646,935 A | * | 7/1997 | Ishikawa et al. ............ 370/207 |
| 5,953,311 A | * | 9/1999 | Davies et al. ............... 370/210 |
| 6,151,296 A | * | 11/2000 | Vijayan et al. ............. 370/208 |
| 6,173,016 B1 | * | 1/2001 | Suzuki ....................... 375/295 |
| 6,188,717 B1 | * | 2/2001 | Kaiser et al. ............... 375/148 |

FOREIGN PATENT DOCUMENTS

| | | |
|---|---|---|
| DE | 43 10 031 A1 | 9/1994 |
| EP | 0 734 132 A2 | 9/1996 |

OTHER PUBLICATIONS

International patent Application WO 91/14316 (Moose), dated Sep. 19, 1991.

International Patent Application WO 92/20179 (Müller), dated Nov. 12, 1992.

(List continued on next page.)

*Primary Examiner*—Don N. Vo
(74) *Attorney, Agent, or Firm*—Laurence A. Greenberg; Werner H. Stemer; Gregory L. Mayback

(57) ABSTRACT

The system achieves high bandwidth efficiency and a low bit and message error probability in digital data transmission. The system, with its associated methods and devices, obviates carrier synchronization or clock synchronization. Digital multicarrier transmission with coding and decoding is carried out on the basis of block synchronization, wherein, for carrier modulation, the modulation of the subcarriers is carried out differentially in coded form in the direction of the subcarriers, that is to say in the frequency domain.

30 Claims, 3 Drawing Sheets

OTHER PUBLICATIONS

S.B. Weinstein: "Data Transmission by Frequency–Division Multiplexing Using the Discrete Fourier Transform", IEEE Transactions on Communication technology, vol. COM–19, No. 5, Oct. 1971, pp. 628–634.

John A. C. Bingham: "Multicarrier Modulation for Data Transmission : An Idea Whose Time Has Come", May 1990, IEEE Communications magazine, pp. 5–14.

Gene C. porter: "Error Distribution and Diversity Performance of a Frequency–Differential PSK HF Modem", IEEE Transactions on Communications Technology, vol. 16, No. 4, Aug. 1968, pp. 567–575.

Paul H. Moose: "Differentially Coded Multi–Frequency Modulation For Digital Communication", in Luis Torres et al. (ed.): "Signal Processing V Theories and Applications", vol. III, 1990, Elsevier, Amsterdam, pp. 1807–1810.

L. Olofsson et al.: "Design of OFDM Systems at High Power Levels", J. of Opt. Commun. 17 (1996) 3, pp. 95–97.

Karl Dirk Kammermeyer: "Nachrichtenübertragung", signal transmission, B.G. Teubner, Stuttgart, 1992, pp. 68–70, 372, 378, 379, 606–613.

\* cited by examiner

◇ Support points n (0 to 9)

— linear regression

US 6,442,211 B1

SYSTEM FOR DIGITAL INFORMATION TRANSMISSION WITH ASSOCIATED METHODS AND DEVICES

CROSS REFERENCE TO RELATED APPLICATION

This is a continuation of copending International Application PCT/EP97/05162, filed Sep. 19, 1997, which designated the United States.

BACKGROUND OF THE INVENTION

Filed of the Invention

The invention relates to a system for digital information transmission, to a method and to a device for producing a transmission signal, to a demodulation method and to a receiver for receiving a transmission signal.

A multicarrier transmission method for transmitting digital data is generally known in information technology, which method uses a discrete Fourier transform for signal synthesis. Multicarrier transmission methods are described, for example, by John Bingham in "Multicarrier Modulation for Data Transmission: An Idea Whose Time Has Come," IEEE Communications Magazine, May 1990, pages 5–14.

One specific method in this context is, for example, the so-called OFDM method (OFDM=orthogonal frequency division multiplexing), also referred to as the DMT method (DMT=discrete multitone), which is described by Weinstein and Ebert in "Data Transmission By Frequency-Division Multiplexing Using The Discrete Fourier Transform," IEEE Transactions on Communication Technology, vol. COM-19, no. 5, October 1971, pages 628–34. The action of pulse interference between successive symbols is solved using the already known method of inserting a guard interval.

U.S. Pat. No. 5,345,439 to Marston discloses a signal processing apparatus, in which one appliance uses various modulation formats for universal application. U.S. Pat. No. 4,313,197 to Maxemchuk discloses a device for multiplexing and demultiplexing signals, in particular voice signals. Fourier transformation is used in that case. One application of the OFDM method for optical transmission is known from Olofsson et al.: "Design of OFDM Systems at High Power Levels," 17 Journal of Optical Communications, 1996, 3, pages 95–97.

German Patent Application No. 43 10 031 discloses a method for correcting the phase amplitude of a broadband received signal, in which the individual carrier frequencies that are used are phase modulated using the COFDM method. In that method, the data blocks are synchronized to one another in the time domain.

Fundamental principles relating to these techniques and methods can be found in the textbook "Nachrichtenubertragung" [Information transmission] by Karl Dirk Kammermeyer, Teubner Verlag, Stuttgart, 1992, in particular on pages 68–70, 372, 378, 379 and 606–613.

The most recent advance in the art is described in the international PCT publication WO 91/14316. Of similar interest is a published article by Paul Moose: "Differentially Coded Multi-Frequency Modulation For Digital Communications," FIFTH EUROPEAN SIGNAL PROCESSING CONFERENCE, Sep. 18–21, 1990, Amsterdam, Netherlands, pages 1807–10. These publications provide so-called baud synchronization, in which a number of blocks of code symbols are preceded by a common synchronization baud.

Error coding for the so-called PSK method with an RF modem is known from Gene Porter: "Error Distribution And Diversity Performance Of A Frequency-Differential PSK HF Modem," IEEE TRANSACTIONS ON COMMUNICATION TECHNOLOGY, Vol. 16, No. 4, August 1996, New York, pages 567–75.

A further method and arrangement for differential modulation of signals in a multichannel transmission system is known from international PCT publication WO 92/20179.

SUMMARY OF THE INVENTION

It is accordingly an object of the invention to provide a system with associated methods and devices for digital information transmission for channels with dispersive distortion, which overcomes the above-mentioned disadvantages of the heretofore-known devices and methods of this general type and which avoids complex carrier phase and sampling phase synchronization, with high bandwidth efficiency and a low error rate.

With the foregoing and other objects in view there is provided, in accordance with the invention, an improved method of producing a transmission signal for digital information transmission, wherein, for multicarrier transmission, subcarriers are modulated with channel coded parallel code symbols of an input signal by means of differential coding in the frequency domain, and synchronization information is added to the transmission signal. The improvement comprises:

prior to the differential coding, error coding and/or interleaving;

after the differential coding, producing a serial output signal by means of parallel/serial conversion;

assigning each block of code symbols, as synchronization information, a preamble for block synchronization; and adding to each block of code symbols a transmission pause after the differential coding.

In accordance with an added feature of the invention, the serial output signal is subjected to digital/analog conversion.

In accordance with an additional feature of the invention, the serial output signal is transmitted in transmission blocks transmitted with time discontinuities and/or in burst mode.

In accordance with another feature of the invention, after the differential coding, there is added to each block of code symbols at a start thereof, a periodic continuation as a guard interval.

In accordance with a further feature of the invention, prior to the differential coding, the code symbols are assigned to a signal space by means of a PSK or QAM method.

In accordance with again a further feature of the invention, after the differential coding, the signal is subjected to an inverse discrete Fourier transform (IDFT).

With the above and other objects in view there is also provided, in accordance with the invention, a device for producing a transmission signal for digital information transmission with a multicarrier transmission method, comprising:

a module for carrier modulation receiving channel coded, parallel code symbols of an input signal and adding code symbols to subcarriers by means of differential coding in a frequency domain, wherein the transmission signal contains synchronization information;

a module for at least one of error coding and interleaving connected upstream of the module for carrier modulation in a signal flow direction;

a parallel/serial converter connected downstream of the module for carrier modulation in the signal flow direction;

a synchronization device for producing synchronization information, the synchronization device producing a preamble for each produced block of code symbols for block synchronization; and an element for producing a transmission pause between successive blocks.

There is also provided, in accordance with the invention, an n improved demodulation method for a received multicarrier transmission signal, wherein code symbols are modulated onto subcarriers by means of differential coding in the frequency domain, and wherein blocks follow one another with time discontinuities, and a phase of complex subcarrier coefficients is distinguished and blocks of code symbols are synchronized. The improvement comprises the following steps:

prior to differentiation, subjecting the received transmission signal to analog/digital conversion with subsequent serial/parallel conversion;

prior to differentiation, removing any transmission pause between adjacent blocks;

subsequent to differentiation, carrying out one of error detecting respective preambles assigned to the blocks, and synchronizing each of the blocks.

There is furthermore provided, in accordance with the invention, a receiving device for a received multicarrier transmission signal, wherein code symbols are modulated onto subcarriers by means of differential coding in a frequency domain, and wherein blocks follow one another with time discontinuities, comprising:

an analog/digital converter receiving a transmission signal;

a serial/parallel converter connected downstream of the analog/digital converter in a signal flow direction;

a demodulator for differentiating a phase of complex subcarrier coefficients and for synchronizing blocks connected downstream of the serial/parallel converter in the signal flow direction;

an error decoding and/or deinterleaving module connected downstream of the demodulator in the signal flow direction;

means for removing a transmission pause between the blocks; and a synchronization device for detecting preambles assigned to the respective blocks of code symbols and for synchronizing with the preambles.

With the above and other objects in view there is also provided, in accordance with the invention, a system for digital information transmission with a multicarrier transmission method, comprising:

a device for producing a transmission signal, the device having a module for carrier modulation receiving channel coded parallel code symbols of an input signal and adding to subcarriers thereof the code symbols by means of differential coding in a frequency domain, an error coding and/or interleaving module connected upstream of the module for carrier modulation in a signal flow direction, and a parallel/serial converter connected downstream of the module for carrier modulation in the signal flow direction;

means for producing synchronization information by producing a preamble for each produced block of code symbols for block synchronization, and an element for inserting a transmission pause between successive blocks;

a receiving device for the received multicarrier transmission signal in which the blocks follow one another, possibly with time discontinuities, the receiving device having a serial/parallel converter connected downstream of the parallel/serial converter in the signal flow direction, a demodulator for differentiating a phase of complex subcarrier coefficients connected downstream of the serial/parallel converter, an error decoding and/or deinterleaving module connected downstream of the demodulator, means for removing the transmission pause from between the blocks, means for detecting the preambles respectively assigned to respective blocks, and for synchronizing the respective blocks.

In order to avoid complex methods for carrier phase and sampling phase synchronization, an essential fundamental principle of the invention is the assignment of the binary code symbols to the subcarriers by differential coding in the direction of the subcarriers, that is to say in the frequency domain. In contrast to this, in the prior art, this is achieved by differential modulation in the time domain. Together with channel coding, and possibly code symbol scrambling along the subcarriers, it is possible to dispense entirely with carrier phase synchronization. The permissible tolerances in this case are particularly high for sampling phase synchronization.

A procedure is provided for block or frame synchronization, which operates with a preamble in order to identify the block start, and thus the sampling phase. An autocorrelation of the Barker type, for example, is suitable for this purpose. This is advantageous in the case of an application with discontinuities during operation, particularly in a cable-based network, such as the power distribution network, or in a radio network.

The information transmission method achieved using the invention is suitable for time-variant or time-invariant channels with intersymbol interference (reflections), that is to say with dispersive distortion. In this case, the available frequency band is divided into M sub-channels, in which case all the sub-channels are independent of one another and have a response which has virtually no frequency selectivity. The response without any frequency selectivity results from the fact that the bandwidth of a sub-channel is so narrow that the channel transfer function within a sub-channel is virtually constant. The invention is suitable, for example, for use with remote data transmission for meters, or in wire-free telecommunications or telephone technology. The following text explains the solutions to the problem and advantageous refinements in more detail.

A method for producing a transmission signal for digital information transmission provides that subcarriers are modulated with channel-coded parallel code symbols of an input signal by means of differential coding in the frequency domain. The code symbols can advantageously be assigned, before the differential coding, to a signal space using the PSK or QAM method, which technique is also called mapping. The code symbols can in this case be error-coded and/or interleaved before the differential coding. This allows a high Hamming spacing and low error rate or error probability to be achieved.

It is advantageous if each block (which can also be described as a time domain sequence) of code symbols has added to it, after the differential coding, a transmission pause and, possibly, a periodic continuation in the sense of a preamble, in particular at the block start. This simplifies demodulation and block synchronization in the receiver. The transmission pause avoids a DMT block being interfered with by the influence of an adjacent block, thus simplifying demodulation in the receiver.

For direct, simple production of the transmission signal, a serial output signal can be produced after the differential coding by means of parallel/serial conversion, which output signal is advantageously subsequently subjected to digital/analog conversion, by means of which it is possible to change to a signal that is continuous in the time domain. The output signal may in this case comprise serial transmission blocks, which are transmitted with time discontinuities, in particular using the burst mode. An inverse discrete Fourier transform is preferably carried out for differential coding.

With regard to the device for producing a transmission signal for digital information transmission, the invention provides that this device has a module for carrier modulation, to which channel-coded, parallel code symbols of an input signal are supplied and in which the subcarriers have the code symbols added to them, by means of differential coding in the frequency domain.

A mapping module can advantageously be connected upstream of the module for carrier modulation, in which mapping module the code symbols are assigned to a signal space, using the PSK or QAM method. In other words, the code symbols are assigned a sequence of amplitude coefficients of a PSK constellation, which are subsequently used for modulation of the subcarriers by means of differential coding. An error-coding and/or interleaving module can advantageously be connected upstream of the module for carrier modulation, which results in the error rate during transmission being reduced.

A parallel/serial converter and a digital/analog converter can be connected downstream of the module for carrier modulation, in which case transmission blocks can be produced with time discontinuities, in particular using the burst mode, that is to say not continuously, as the output signal at the output of the digital/analog converter. The module for carrier modulation for the differential coding advantageously comprises an element for inverse discrete Fourier transform. This allows rapid, precise coding.

The solutions according to the invention for the demodulation method at the receiver end and for the demodulator are designed in a corresponding manner to the above transmitter-end refinements, essentially using inverse functions and procedures. In this case, it is advantageous if any transmission pause which is contained in the transmission signal is removed before the process of distinguishing the received transmission signal (also called the received signal). A preamble which is contained in the transmission signal is advantageously detected for block or phase synchronization. The block start can be identified in a simple manner by correlation calculation, calculating the gradient of the correlation magnitudes and threshold-value distinction.

As explained above, the system for digital information transmission includes:
  a device for producing a transmission signal with a module for carrier modulation, to which channel-coded parallel code symbols of an input signal are supplied and in which the subcarriers have the code symbols added to them by means of differential coding in the frequency domain, and
  a receiving device with a demodulator, in which the phase of the complex subcarrier coefficients is distinguished.

The transmission path used may be cable-free or wire-free, for example a radio link. An optical carrier medium, in particular an optical conductor, is also suitable for use as the transmission path. A power cable, a non-power cable or a corresponding network can also be used in a simple way as the transmission path. A link similar to an EIB bus or a power distribution network is suitable, for example, for this purpose. One preferred field of application for the invention is remote meter reading in an electrical distribution network.

It is essential for the preferred embodiment
  that parallel, independent sub-channels are provided at the transmitter end by using inverse discrete Fourier transform;
  that pulse interference to successive blocks is eliminated by using a periodic continuation;
  that discrete Fourier transform of a block at the receiver end and decoding of all the sub-channel signals are used to obtain the digital data;
whereby
  the digital data are channel-coded;
  the modulation of the subcarriers is carried out differentially and in coded form in the direction of the subcarriers; and
  at the receiver end, the phase of the complex subcarrier coefficients is distinguished, in such a way that the reception points in the signal space are recovered.

The above concept is characterized by a specific carrier assignment in conjunction with channel coding and so-called interleaving, thus avoiding the need for channel equalization using $$\frac{1}{H(f)},$$

and with there being no need for carrier phase synchronization. Furthermore, the requirements for sampling phase synchronization are so minor that the influence of tolerances up to several hundred percent is virtually irrelevant.

The system is preferably produced, with its devices, using computers, processors and/or signal processors with digital information processing and other suitable means for digital signal processing. The methods can at least partially be implemented in this case in the form of programs or else in an ASIC.

Other features which are considered as characteristic for the invention are set forth in the appended claims.

Although the invention is illustrated and described herein as embodied in a system for digital information transmission, with associated methods and devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
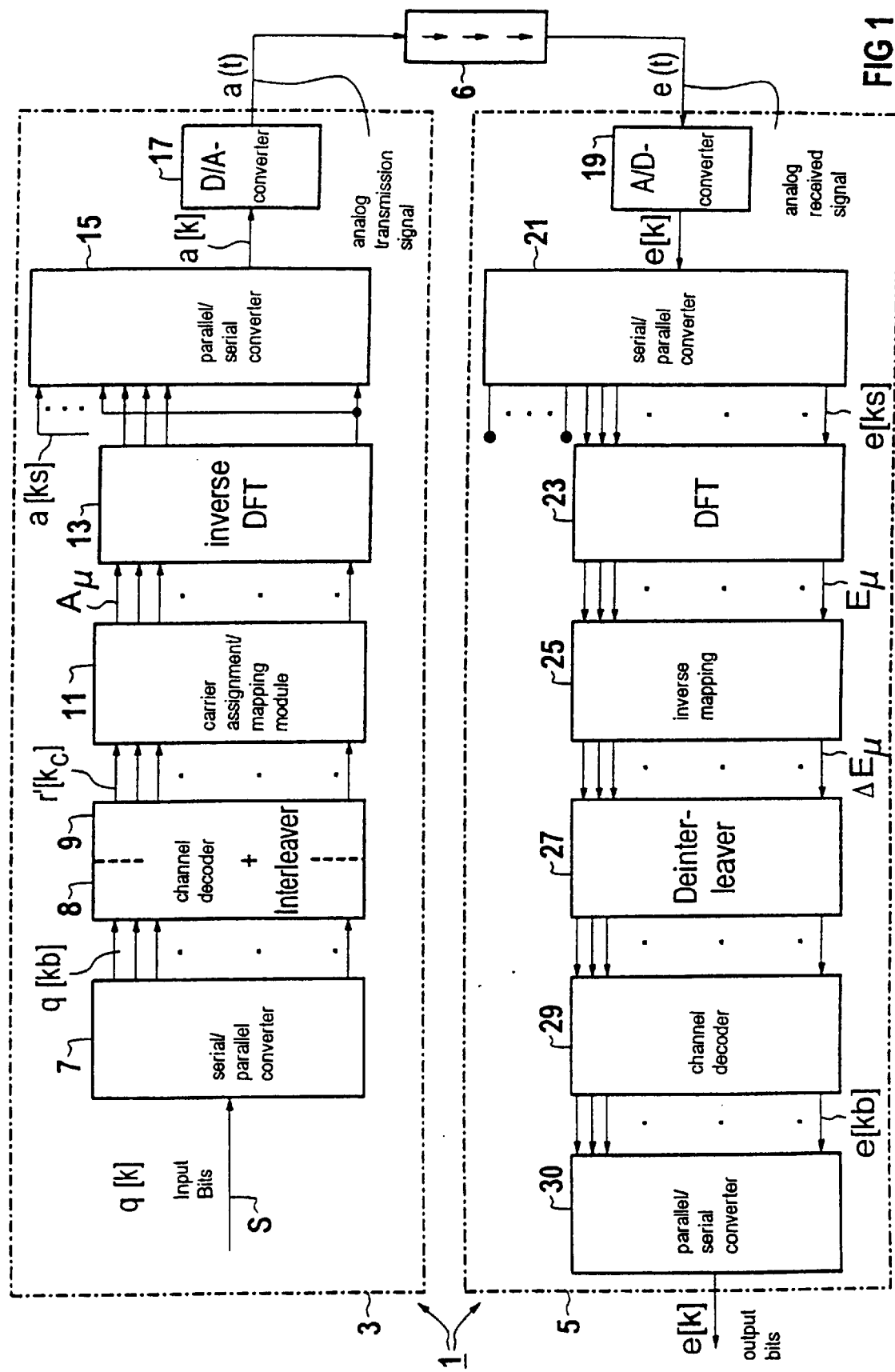
FIG. 1 is a block diagram of an information transmission system.

Referring now to the figures of the drawing in detail and first, particularly, to FIG. 1 thereof, there is seen a block diagram of a system for information transmission 1 (referred to as the system 1 in the following text), which will initially be explained roughly and in schematic form. The reference numerals 3 and 5 denote, respectively, the devices at the transmitter end and at the receiver end of the system 1. Specifically, numeral 3 denotes a device for producing a transmission signal and may be at least a part of a transmitter. In an analogous manner to this, 5 represents a receiving device, or at least a part of it. The reference symbol 6 denotes a transmission path.

The input of the system 1 is supplied, as the input signal S, with information intended for transmission. In the present case, it is assumed that, by way of example, this is digital information in the form of serial input bits, which may also be referred to as source symbols q[k]. The serial input signal S is then first of all supplied to a serial/parallel converter 7, so that a parallel signal is produced, with blocks as source symbols q[kb]. If the input signal S is already in parallel form, then it may be possible to dispense with the serial/parallel converter 7.

This is followed by a channel coder 8, which produces a block of code symbols r[$k_c$], which is supplied to an error-coding or interleaving module (the interleaver 9 in the following text). The interleaver 9 produces a block of resorted or interleaved code symbols r'[$k_c$], which have a maximum signal spacing in the signal space.

A mapping module 11 is connected downstream of the interleaver 9 in the described signal flow direction. In the mapping module 11 the code symbols r'[$k_s$] are assigned to a signal space using the PSK or QAM method. These methods are known per se from the prior art referred to above. A block of signal points $A_\mu$ is then available as the output signal.

This is followed by a module for carrier modulation 13, in which each subcarrier of the multicarrier transmission method is pulse-amplitude-modulated (PAM). An inverse discrete Fourier transform (IDFT) is used for this purpose. The resultant so-called channel symbols a[ks] are supplied to a parallel/serial converter 15, which produces a time-discrete transmission sequence a[k].

An element (which is not shown in any more detail) for producing a transmission pause between successive blocks can be provided in or adjacent to the module for carrier modulation 13. A preamble may possibly also be added to each block in this case. This will be described specifically further below.

The transmission sequence a[k] is converted by a downstream digital/analog converter 17 into an analog transmission signal a(t), which then—possibly with the interposition of further technical means which are not shown in any more detail, for example an antenna, can be passed to the transmission path 6.

Due to the fact that the system 1 can be used for widely differing applications, any other required transmission paths are also feasible. The transmission path 6 may be configured, for example, to be cable-free or wireless, in particular as a radio link or optical link. An optical transmission medium, in particular an optical conductor, is also suitable. As a further option, a power cable, non-power cable or a corresponding network may also be used. A link similar to an EIB bus is particularly suitable for this purpose, or else a power distribution network which can be used for many types of data transmissions, in particular for meter reading for the purposes of an energy management system. The advantages of low-error transmission are particularly important in this case.

The process at the receiver end is essentially the inverse of that at the transmitter end, in order to recover the original input signal S. The transmission signal a(t) which is received by the receiving device 5, called the received signal e(t) in the following text, is initially supplied to an analog/digital converter 19. A serial/parallel converter 21 is connected downstream from the A/D converter 19. The serial/parallel converter 21 produces channel symbols e(ks).

These channel symbols e(ks) are supplied to a downstream demodulator 23, which works on the basis of discrete Fourier transform. The transmission pause (guard interval) which may have been inserted can also be removed here. The subcarrier coefficients $E_\mu$ then become the output signal. This is followed, in the same way as at the transmitter end, by a module 25 for inverse mapping, an error-decoding and/or deinterleaving module 27 (also called a deinterleaver) and a channel decoder 29. If the intention is that the original signal to be demodulated is to be output as a serial signal, then this may also be followed by a parallel/serial converter 30.

The following text provides a further description of details and specific features of the preferred embodiment of the system and of the methods used in it. Other terminology and designations that are known from practice but differ from those above may also be used in this case, in order not to constrict the general concept of the system.

The system is based on a DMT process (DMT=discrete multitone) in conjunction with DPSK modulation (DPSK=difference phase shift keying). The basic structure of the system 1 as shown in FIG. 1 corresponds to a conventional OFDM system. This is based on serial/parallel conversion of the source symbols q[kb]. A block of source symbols is then channel-coded. Convolution coding or block coding is particularly suitable for this purpose, as is described, for example, by John Proakis in "Digital Communications," McGraw-Hill New York 1995, 3rd ed. This results in a block of code symbols r[kc], which are resorted or interleaved by the interleaver 9, thus producing r'[kc]. The block of code symbols r'[kc] is then assigned to a block of signal points A=[A1 $A_\mu$ AM], using a PSK scheme, in the signal space (mapping).

Each subcarrier is now phase-amplitude modulated with the associated amplitude coefficient Aμ. This is done using an inverse discrete Fourier transform (IDFT). Splitting between the M sub-channels is carried out by inverse discrete Fourier transform (IDFT) in accordance with the following relationship, in which j denotes the square root of −1.

$$a[k] = IDFT\{A_\mu\} = \frac{1}{M} \cdot \sum_{\mu=1}^{M} A_\mu \cdot e^{+j\frac{2\pi}{M}(\mu-1)k}$$

where: K=result index, M=transformation length, μ=sequential index and A=amplitude.

A correction factor 1/M is required in this definition of DFT, owing to Parseval's equation. This signal synthesis is carried out efficiently using fast Fourier transform (FFT) algorithms, with M being a power of two. The 2M base functions for the 2M-dimensional signal space are given by the base functions for discrete Fourier transform in accordance with the relationship $$e^{+j\frac{2\pi}{M}\cdot\mu\cdot k} = \cos\left(\frac{2\cdot\pi}{M}\cdot\mu\cdot k\right) + j\cdot\sin\left(\frac{2\cdot\pi}{M}\cdot\mu\cdot k\right)$$

for which reason they are also orthogonal. Each complex subcarrier coefficient $A_\mu$ is a vector in the 2-dimensional signal space of the $\mu^{th}$ subcarrier.

The channel symbols a[ks] resulting from this have added to them a periodic continuation or transmission pause at the start of each block (the so-called guard interval). After subsequent parallel/serial conversion, this results in a time-discrete transmission sequence a[k]. Provided the guard interval is chosen to be sufficiently long, successive blocks are transmitted without any pulse interference. With regard to the guard interval, see also Benndorf et al: "Angepasste Signale für Kanäle mit Intersymbolinterferenzen, Archiv der Elektrischen Übertragung [Adapted Signals for Channels with Intersymbol Interference, Electrical Transmission Archive] Vol. 46, 1992, pages 409–14. The analog transmission signal a(t) is produced simply by D/A conversion of the transmission sequence a[k].

After transmission over the transmission channel 6, the received transmission signal is in the form of analog received signal e(t). Bandpass signals are, as a rule, treated as equivalent low-pass signals. In practice, the signal therefore has to be low-pass filtered in order to limit the noise bandwidth and to suppress any aliasing components. After A/D conversion, the samples are converted from serial to parallel form using the channel symbol clock T, and the guard interval is removed.

Figure 2:
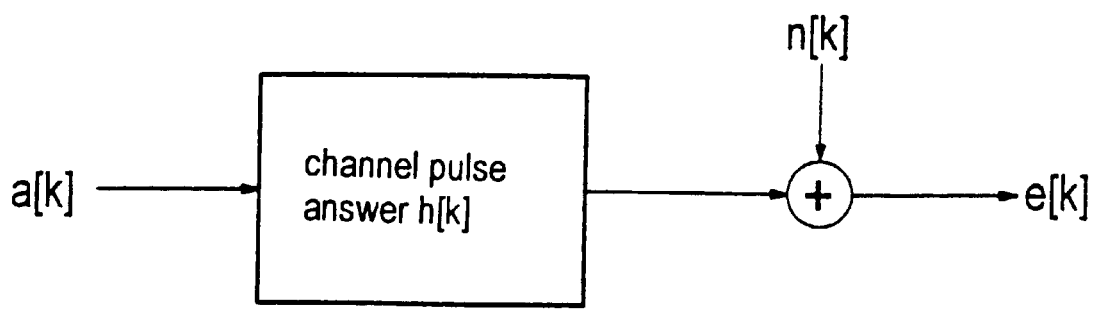
FIG. 2 is a diagram of a time-discrete channel model.

The amplitude coefficients of the subcarriers Ei are obtained using discrete Fourier transform (DTF). In this case, the DFT uses 2M parallel correlators, whose output is the received amplitude coefficients $E_\mu$ of the subcarriers, corresponding to sub-channels with 2-dimensional transmission signals. If the channel is modeled by a non-recursive filter with an impulse response h[k] and white random (gaussian) noise n[k] is added to this (in this context, FIG. 2 shows a time-discrete channel model), then this results in the received values $E_\mu$ for the subcarriers Ei in accordance with the following equation (provided the guard interval is sufficiently long):

$$E_\mu = \lambda_\mu \cdot A_\mu + N_\mu$$

where $$\lambda_\mu = \sum_{k=0}^{M-1} h[k]\cdot e^{-j\frac{2\pi}{M}\cdot k\cdot(\mu-1)} = H\left(f = \frac{2\pi}{M\cdot T}\cdot\mu\right) \text{ and}$$

$$N_\mu = \sum_{k=0}^{M-1} n[k]\cdot e^{-j\frac{2\pi}{M}\cdot k\cdot(\mu-1)}.$$

The transmission can thus be regarded as a weighting of the subcarrier coefficients $A_\mu$ with the $\lambda\mu$, as is shown in FIG. 2. The convolution of discrete channel symbols a[k] with the discrete channel impulse response h[k] appears, in terms of the amplitude coefficients of the subcarriers, as a complex (time-invariant) weighting of the transmission carrier values with the samples of the channel transfer function.

The assignment of the subcarrier values in signal space to binary symbols is carried out using inverse mapping. Subsequent decoding produces the estimated, binary source symbols. The input values to the decoder may be decision bits (quantized to 1 bit) or soft-decision values (quantized to a number of bits).

The preferred procedure for the system 1 comprises a specific combination of channel coding, interleaver and specific carrier allocation. The subcarrier allocation is determined using the following method:

The block of code symbols r'[$k_c$] is assigned to a block of signal points $\Delta A = [\Delta A_2\ \Delta A_\mu\ \Delta A_{M0}]$ using a PSK scheme (mapping), in which only M0 of M are used rather than all the subcarriers (unused subcarriers are set to zero).

For example 4-PSK with:

| Input bits | $\Delta A_\mu$ |
|---|---|
| 00 | 1 |
| 10 | j |
| 11 | −1 |
| 01 | −j |

Each signal point $\Delta A_\mu$ is accordingly assigned to one of the M0 sub-channels (subcarriers) used, with one sub-channel being reserved. Assignment to the subcarriers is now carried out using differential coding along the subcarriers in the frequency domain, that is to say not in the time domain as is normal with known DPSK modulation. The allocation of the subcarriers $A = [A1\ A_\mu\ AM]$ results from the $\Delta A_\mu$ in accordance with the following equation:

$$A_\mu = \begin{cases} \Delta A_\mu \cdot A_{\mu-1} & \mu = 2(1)M_0 \\ 0 & \mu = M_0 + 1(1)M \end{cases}$$

where $|A_\mu|,|\Delta A_\mu|:=1$
where A1 is set to be constant, and is thus used as a reference.

The received subcarrier values $E_\mu$ are differentially demodulated, resulting in differentiation in the subcarrier direction. If one considers interference-free transmission, then:

$$\Delta E_\mu = E_\mu \cdot E_{\mu-1}{}^*$$

$$= H_\mu \cdot A_\mu \cdot H_{\mu-1}{}^* \cdot A_{\mu-1}{}^*$$

$$|H_\mu|\cdot|H_{\mu-1}|\cdot e^{+j(\alpha_\mu - \alpha_{\mu-1})}\cdot \Delta A_\mu$$

If $\Delta f$ is small, then $$\Delta f = \frac{2\pi}{T_s} = \frac{2\pi}{M\cdot T}$$

(that is to say M>>1), the estimate $$\alpha_\mu - \alpha_{\mu-1} << 1$$

is highly valid and, to a good approximation:

$$\approx |H_\mu|\cdot|H_{\mu-1}|\cdot \Delta A_\mu$$

In this case, H* and A* are the complex conjugates of H and A, respectively.

The differentiation thus results in phase distortion correction. This corresponds to the relevant distortion correction for PSK modulation. No amplitude distortion correction is required, but can easily be implemented as an option, by complex division. The error, which is generally small, in the phase distortion correction can be compensated for by simple channel coding. A major advantage of the above procedure is that phase distortion correction can be carried out even though no explicit distortion correction is provided.

In addition, differential coding in the frequency domain allows each block to be decoded separately, which is impossible with coding in the time domain. The phase error of the amplitude coefficients thus depends only on the interference signal, and to only a minor extent on the phase distortion in the transmission channel.

The system 1 uses block synchronization. In general, the transmitter and receiver in a transmission system have to be synchronized to one another. In the present case, sampling phase synchronization or detection of the block start is sufficient. In practice, a sampling phase error causes rising, that is to say linear, phase distortion of the subcarriers. This follows from the translation theorem for discrete Fourier transform $$DFT\{v[k-v]\} = e^{+j\mu\frac{2\pi v}{M}} \cdot DFT\{v[k]\}$$

The effects of this phase error can substantially be compensated for by the differentiation in the receiver. Together with channel coding, sampling phase errors of up to ±5T (T=sampling rate)–this corresponds to ±500% of the channel symbol clock rate, or ±2% of the block length without a guard interval—do not lead to any significant effects on the bit error rate. The differential coding in the carrier direction thus saves phase distortion correction, as well as complex synchronization methods, by means of a very simple modulation method.

Figure 3:
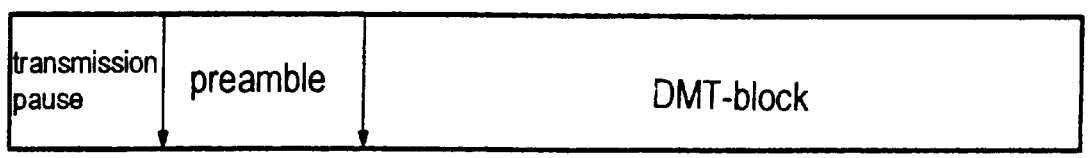
FIG. 3 is a block illustrating a transmission sequence for synchronization with a preamble.

The minor requirements for phase synchronization permit a simple synchronization method to be used. To this end, the transmission sequence of a block has a transmission pause and a preamble added to it. FIG. 3 shows such a transmission sequence a[k]. The detection of the preamble, and thus the phase synchronization, are carried out at the receiver end in three steps:

correlation in the receiver, possible calculation of the gradient of the magnitude values, and threshold value decision.

Simulations have shown that this allows an accuracy of ±T to be achieved. The tolerances are thus not exhausted. Loss from synchronization is in this case minimal. The method can easily be integrated in a digital module, since correlation and gradient calculation can be produced as an FIR filter (FIR=finite impulse response). The filter coefficients for the correlation filter $h_{cor}[k]$ result from the transmitted preamble sequence $h_{sync}[k]$ as an associated single-matched filter, in accordance with the relationship:

$$h_{cor}[k] = h_{sync}*[-k].$$

Figure 4:
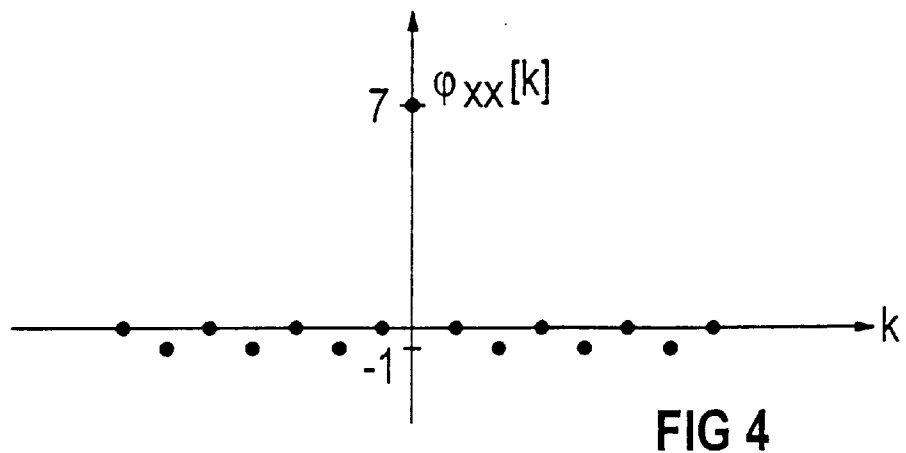
FIG. 4 is a diagram showing an aperiodic autocorrelation function of the 7th Barker Sequence.

Suitable preamble sequences include, for example, Barker sequences, Lindner sequences or Lehmann sequences (see, for example, Klaus Lehmann: "Entwurf von Filterstrukturen zur Erzeugung mehrstufiger Codes mit Barker-Autokorrelations-Eigenschaften" [Design Of Filter Structures For Producing Multistage Codes With Barker Autocorrelation Characteristics], Archiv für Elektronik und Übertragungstechnik [Archive for Electroncis and Transmission Technology] Volume 33, 1979 pages 190–92). The important factor in this case is the aperiodic autocorrelation function of the sequence (see also Hans Dieter Luke: "Korrelationssignale" [Correlation Signals], Springer Berlin 1992). This should have a pulsed character, as shown in FIG. 4. FIG. 4 shows an aperiodic autocorrelation function (ACF) for the 7th Barker sequence. There is no need for any limitation to binary preamble sequences.

Any gradient calculation which may be carried out in this case relates to the gradient of a straight line passing through a limited number of correlation values Cv, using linear regression methods. Linear regression minimizes the sum of the squares of the errors between the points on the straight line and the correlation values. The duration of the time window, and thus the number of points which are interpolated by a straight line, in this case depends on the application or channel. Such a gradient calculation can likewise be carried out using an FIR filter.

Figure 5:
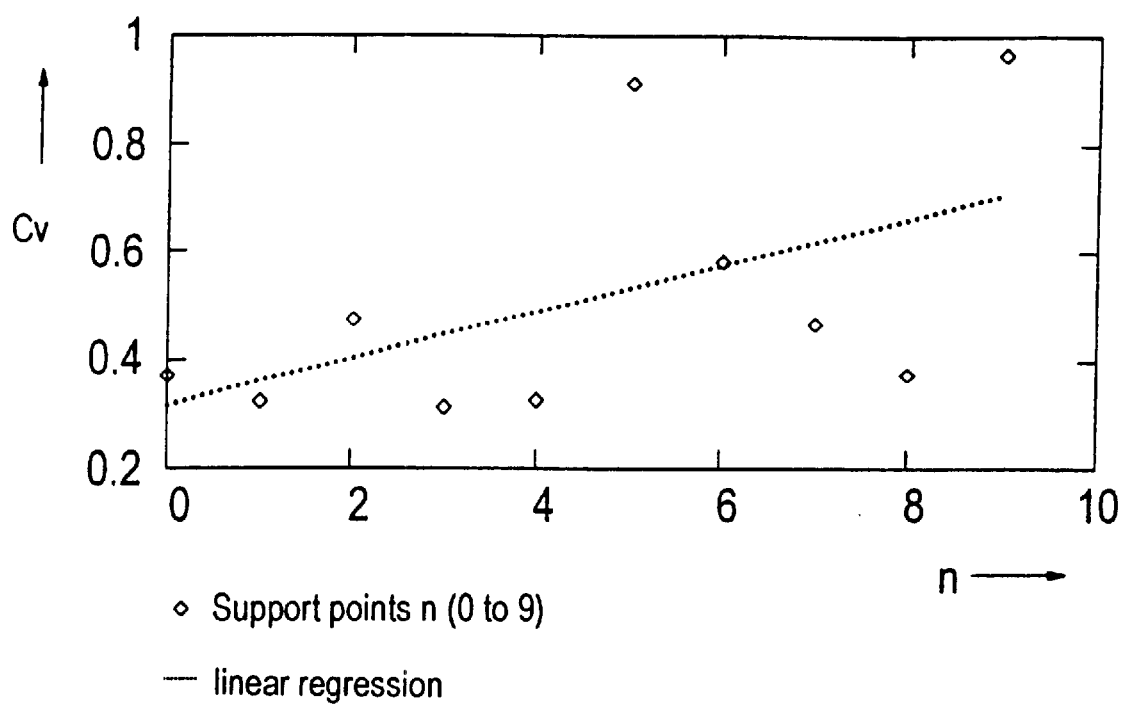
FIG. 5 is a graph of an exemplary gradient calculation using linear regression with ten support values.

FIG. 5 shows one example of a gradient calculation using linear regression based on 10 support points (n=0 to 9). In this case, a straight line is passed through 10 points, in order to illustrate the procedure. Alternatively, if the ACF is suitable, a direct threshold value decision may also be used.

Two carrier oscillation parameters have to be investigated for carrier synchronization: the effects of a carrier phase error and a carrier frequency offset. If a carrier phase error $\Delta e$ is present, this means that the phase of all the subcarriers is shifted by the magnitude of the phase error $\Delta e$ in accordance with the following relationships.

$$v_{NF}[k] = v_{HF}[k] \cdot e^{-j(2\pi fTk + \Delta e)}$$

$$v_{NF}[k] = v_{HF}[k] \cdot e^{-j2\pi fTk} \cdot e^{-j\Delta e}$$

After differential demodulation, this error is completely eliminated. There is therefore no need for carrier phase synchronization.

On the other hand, carrier frequency synchronization is always worthwhile. In this case, simulations have shown that a frequency offset of $10^{-5}$ with respect to the sampling frequency (in baseband, that is to say at the channel symbol clock rate) has virtually no influence. Greater discrepancies cause rapid degradation of the system. The requirements for frequency accuracy in the method can be satisfied without any problems using means based on the current prior art.

For digital data transmission, the new system and its methods and devices result in high bandwidth efficiency and a low bit or message error probability, with method steps and interrelationships being combined with one another and complementing one another in a particularly advantageous manner. The invention provides digital data transmission with coding and decoding in which, in contrast to the prior art, there is no need for carrier synchronization or clock synchronization. Only block synchronization is still required, and this is achieved in a simple manner.

Figure 6:
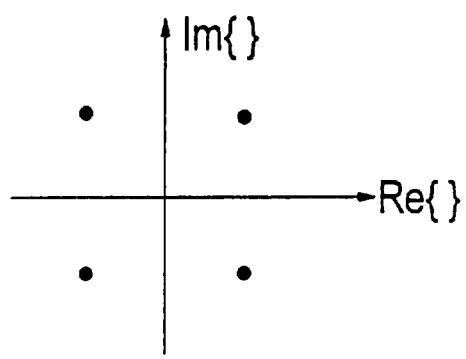
FIG. 6 is a diagram of a signal constellation for 4-PSK.

The advantageous modulation in conjunction with suitable coding achieves, for example, a bandwidth efficiency of better than 1 bit/s/Hz for a "four-phase signal," as is shown in FIG. 6 (signal constellation for 4-PSK). Depending on the required data transmission rate, bit error probability and available transmission bandwidth, the described method can be implemented flexibly and without any problems by a simple combination of special hardware, microprocessors, digital signal processors or ASICs which need to be specially developed. The system has already been successfully tested by simulation using specially configured hardware (DSP with PC).

We claim:

1. In a method of producing a transmission signal for digital information transmission, wherein, for multicarrier transmission, subcarriers are modulated with channel coded parallel code symbols of an input signal by means of differential coding in the frequency domain, and synchronization information is added to the transmission signal, the improvement which comprises:

prior to the differential coding, at least one of error coding and interleaving;

subsequent to the differential coding, producing a serial output signal by means of parallel/serial conversion;

assigning each block of code symbols, as synchronization information, a preamble for block synchronization; and subsequent to the differential coding, adding to each block of code symbols a transmission pause.

2. The method according to claim 1, which further comprises subjecting the serial output signal to digital/analog conversion.

3. The method according to claim 1, wherein the serial output signal is transmitted in transmission blocks with one of time discontinuities and in burst mode.

4. The method according to claim 1, which comprises, after the differential coding, adding to each block of code symbols at a start thereof, a periodic continuation as a guard interval.

5. The method according to claim 1, which comprises, prior to the differential coding, assigning the code symbols to a signal space by means of a method selected from the group consisting of PSK and QAM.

6. The method according to claim 1, which comprises, after the differential coding, carrying out an inverse discrete Fourier transform.

7. A device for producing a transmission signal for digital information transmission with a multicarrier transmission method, comprising:

a module for carrier modulation receiving channel coded, parallel code symbols of an input signal and adding code symbols to subcarriers by means of differential coding in a frequency domain, wherein the transmission signal contains synchronization information;

a module for at least one of error coding and interleaving connected upstream of the module for carrier modulation in a signal flow direction;

a parallel/serial converter connected downstream of the module for carrier modulation in the signal flow direction;

a synchronization device for producing synchronization information, said synchronization device producing a preamble for each produced block of code symbols for block synchronization; and an element for producing a transmission pause between successive blocks.

8. The device according to claim 7, which further comprises a digital/analog converter connected downstream of said parallel/serial converter in the signal flow direction.

9. The device according to claim 8, wherein said digital/analog converter has an output outputting an output signal in transmission blocks produced with at least one of time discontinuities and a burst mode.

10. The device according to claim 7, which further comprises a mapping module connected upstream of the module for carrier modulation in the signal flow direction, said mapping module assigning the code symbols to a signal space with a method selected from the group of methods consisting of PSK and QAM.

11. The device according to claim 7, which further comprises a channel coder connected upstream of said module for carrier modulation in the signal flow direction.

12. The device according to claim 7, wherein said module for carrier modulation comprises an element for inverse discrete Fourier transformation.

13. An improved demodulation method for a received multicarrier transmission signal, wherein code symbols are modulated onto subcarriers by means of differential coding in the frequency domain, and wherein blocks follow one another with time discontinuities, and a phase of complex subcarrier coefficients is distinguished and blocks of code symbols are synchronized, the improvement which comprises:

prior to differentiation, subjecting the received transmission signal to analog/digital conversion with subsequent serial/parallel conversion;

prior to differentiation, removing any transmission pause between adjacent blocks;

subsequent to differentiation, carrying out one of error decoding and deinterleaving; and detecting respective preambles assigned to the blocks, and synchronizing each of the blocks.

14. The demodulation method according to claim 13, wherein the differentiation comprises carrying out a discrete Fourier transform.

15. The demodulation method according to claim 13, which comprises assigning an inverse signal space, and subsequently performing a step of channel decoding.

16. The demodulation method according to claim 15, which comprises following the channel decoding by parallel/serial conversion.

17. The demodulation method according to claim 13, which comprises phase synchronizing with the preamble.

18. The demodulation method according to claim 17, wherein the synchronizing step comprises detecting a periodic continuation in the preamble.

19. A receiving device for a received multicarrier transmission signal, wherein code symbols are modulated onto subcarriers by means of differential coding in a frequency domain, and wherein blocks follow one another with time discontinuities, comprising:

an analog/digital converter receiving a transmission signal;

a serial/parallel converter connected downstream of said analog/digital converter in a signal flow direction;

a demodulator for differentiating a phase of complex subcarrier coefficients and for synchronizing blocks connected downstream of said serial/parallel converter in the signal flow direction;

an error decoding and/or deinterleaving module connected downstream of said demodulator in the signal flow direction;

a downstream channel decoder connected downstream of said demodulator in the signal flow direction;

means for removing a transmission pause between the blocks; and a synchronization device for detecting preambles assigned to the respective blocks of code symbols and for synchronizing with the preambles.

20. The receiving device according to claim 19, wherein said demodulator comprises an element for discrete Fourier transformation.

21. The receiving device according to claim 19, which further comprises a module for inverse mapping and for inverse signal space assignment.

22. The receiving device according to claim 21, which further comprises a parallel/serial converter connected downstream of said channel decoder in the signal flow direction.

23. A system for digital information transmission with a multicarrier transmission method, comprising:

a device for producing a transmission signal, said device having a module for carrier modulation receiving channel coded parallel code symbols of an input signal and adding to subcarriers thereof the code symbols by means of differential coding in a frequency domain, an error coding and/or interleaving module connected upstream of said module for carrier modulation in a signal flow direction, and a parallel/serial converter connected downstream of said module for carrier modulation in the signal flow direction;

means for producing synchronization information by producing a preamble for each produced block of code symbols for block synchronization, and an element for inserting a transmission pause between successive blocks;

a receiving device for the received multicarrier transmission signal in which the blocks follow one another, possibly with time discontinuities, said receiving device having a serial/parallel converter connected downstream of said parallel/serial converter in the signal flow direction, a demodulator for differentiating a phase of complex subcarrier coefficients connected downstream of said serial/parallel converter, an error decoding and/or deinterleaving module connected downstream of the demodulator, means for removing the transmission pause from between the blocks, means for detecting the preambles respectively assigned to respective blocks, and for synchronizing the respective blocks.

24. The system according to claim 23, which further comprises a digital/analog converter connected downstream of said parallel/serial converter, and an analog/digital converter connected upstream of said serial/parallel converter in said receiving device.

25. The system according to claim 23, wherein a wireless transmission path is defined through the system.

26. The system according to claim 25, wherein said wireless transmission path is a radio link.

27. The system according to claim 23, wherein an optical transmission path is defined through the system.

28. The system according to claim 27, wherein said optical transmission path is defined in an optical conductor.

29. The system according to claim 23, which comprises a transmission path defined through a link selected from the group consisting of a power cable, a non-power cable, and an equivalent network.

30. The system according to claim 29, wherein the transmission path is defined by a link equivalent to an EIB, or a power distribution network.

* * * * *